W. HEUSSER.
BALANCE.
APPLICATION FILED MAR. 19, 1908.
924,663.
Patented June 15, 1909.
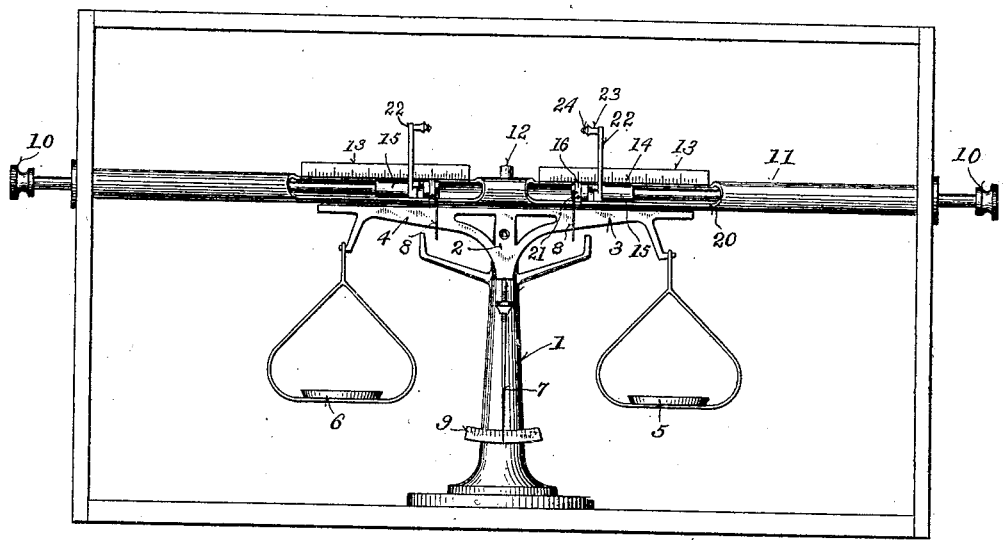

UNITED STATES PATENT OFFICE.

WILFRID HEUSSER, OF SALT LAKE CITY, UTAH.

BALANCE.

No. 924,663.  Specification of Letters Patent.  Patented June 15, 1909.

Application filed March 19, 1908. Serial No. 422,009.

*To all whom it may concern:*

Be it known that I, WILFRID HEUSSER, a citizen of the Republic of Switzerland, residing at Salt Lake City, in the county of Salt Lake and State of Utah, have invented certain new and useful Improvements in Balances, of which the following is a specification, reference being had to the accompanying drawing, forming a part thereof.

This invention relates to balances for weighing, and consists of the improvements to be hereinafter pointed out specifically and claimed.

It is well known that it is customary with ordinary balances to determine the exact weight of an article by the use of riders so-called, which are weights adjustable upon the balance arms. Formerly it was customary to mark graduations directly upon the arms of the balance, by which the effect of the rider could be determined in order to ascertain the weight of the article being weighed. It has been found to be objectionable to place graduation marks upon the arms of the balance, because as these marks are usually cut into the material of the arms, they weaken the arms and cause distortion, which is fatal to the accuracy of the balance. It is absolutely essential however, when riders are used, to employ a scale of some sort by which the effect of the rider may be readily determined. A construction of balance for this purpose has been in use prior to this invention, but said construction was not satisfactory.

The purpose of this invention is to provide means for supporting a graduated scale adjacent a balance arm and means coöperating with said scale to place a rider upon the balance arm or remove it therefrom, the several parts being so constructed and arranged that the position of the rider upon the arm corresponds with a certain predetermined position of the rider controlling mechanism with reference to the scale.

Referring to the drawings which accompany this specification and form a part thereof, and on which the same reference characters are used to designate the same elements wherever they may appear in each of the several figures of the views, Figure 1 is an elevation of a balance with this invention applied thereto; Fig. 2 is a detail on an enlarged scale; Fig. 3 is a section on the lines *a a* of Fig. 2; Fig. 4 is an elevation of a rider; and Fig. 5 is a perspective of a modification.

Referring to the drawings, the numeral 1 designates the pillar, 2 the balance beam provided with the arms 3 and 4, 5 and 6 the pans and 7 the pointer of a balance of any ordinary or preferred type.

It will be understood of course that in the ordinary operation of the balance a suitable weight is placed in one of the pans 5 or 6, and the substance to be weighed in the other, and a rider 8 is then adjusted in or out on an arm of the balance until the pointer 7 stands at zero on its scale 9.

The riders 8 are preferably constructed from a piece of wire in the manner clearly shown by Fig. 4 of the drawings, they being provided with a loop 80, a downwardly extended twisted portion 81, and two outwardly and downwardly flaring legs 82 and 83.

Riders of different weight may of course be provided, and a support for them when not in use may be placed in the balance case, as is ordinarily the practice, these specific details not being shown by the drawings accompanying this specification, as unnecessary illustration would tend to obscure the invention disclosed.

In order to move the riders back and forth upon the scale beam, a handle 10 is provided, which handle should be provided with a support or guide in order that delicate handling may be avoided in manipulating the riders. Preferably this support is afforded by a tube 11 which extends from the exterior of the balance case into the interior thereof, where it may be supported by a stud or pillar 12. This tube may extend adjacent only one arm of the balance, or it may extend adjacent both arms of the balance, the arrangement being such that riders can be used upon either arm or both, as clearly shown by Fig. 1. This tube, which really is only a supporting member for the handle 10, is preferably cut away on one side for substantially the length of the balance arm, and either upon the tube, or preferably upon a separate member 13 secured thereto or adjacent thereto, is marked a scale 14.

Located within the bore of the tube 11 is a slidable member 15, provided with a graduation mark 16, by which the position of said slidable member with respect to the scale 14 may be indicated. This slidable member 15 is preferably composed of a section of tube of a size adapted to fit the bore of tube 11, and tube 11 at its cut-away portion, is cut away for at least half of its diameter, so that member 15 may be inserted sidewise into said bore, it being retained in said bore by screw 17 and spring washer 18, screw 17 passing through a longitudinal slot 19 in the rear of tube 11 opposite the cut-away portion 20.

The member 13 is preferably of ivory, upon which is engraved the scale 14, and the graduation mark 16 is preferably provided upon a piece of ivory 21, secured by a screw or otherwise, to the slidable member 15.

The twisted portion 81 of the riders is designed to support the loops 80 at an exact definite distance above the arms of the beam, so that the arm 22 may be readily engaged therewith or disengaged therefrom, this arm being secured to the handle 10 so as to be rotated thereby and having on its extremity a pin 23 provided with a notch 24, adapted to engage with the loop portion of the riders 8. Arm 22 is firmly secured to the handle 10 so as to be rotated and reciprocated by the handle 10, and slidable member 15 is provided with a longitudinal slot 25 of a width sufficient to enable the arm 22 to be reciprocated therein without reciprocating said slidable member except when said arm is engaged with one extremity or the other of said slot, and at each extremity of said slot is provided a transverse slot 26 and 27, of a width just sufficient to receive arm 22 when it is rotated up thereinto by manipulating handle 10. The lower edge of slot 25 is so disposed that when arm 22 rests thereagainst, arm 22 is substantially horizontal, and the reduced extremity of pin 23 with the balance arm 3 horizontal, is directly in line with the center of loop 80 of the rider 8.

The modified structure shown by Fig. 5 is in all substantial respects similar to the preferred form shown by the other figures of the drawing, the slidable member 150 in this case however, is supported by the supporting member 110, the member 130 provided with the scale 140 being supported by the supporting member 110 in substantially the same way as in the preferred form of apparatus.

The operation and use of the apparatus is as follows: With the parts in the position as shown at the right hand of Fig. 1, the arm 22 may be swung down by rotating the handle 10 until it clears the slot 27, then it can be reciprocated to the left by reciprocating handle 10 until it engages the extremity of slot 25, at which time the loop 80 of the rider will surround the reduced end of pin 23 right over notch 24. The arm 22 may now be raised by rotating handle 10, the arm passing into slot 26. While the parts are in this position, handle 10 may be reciprocated in either direction, thereby reciprocating slidable member 15 and mark 16 with respect to scale 14, and by bringing mark 16 opposite any graduation of scale 14, the rider may be deposited upon the balance arm by rotating arm 22 downwardly by means of the handle 10, when the rider will be deposited upon the balance arm at the position corresponding with the graduation of the scale 14 which registers with the mark 16. In order to move pin 23 out of the way of the rider during the operation of weighing, arm 22 is moved to the right in slot 25, until it reaches the end thereof, and may then be swung up into slot 27.

It will be noticed that no special relation need exist between notch 24 on pin 23 and the scale 14 on member 13, as the effect of the rider need only be known with respect to the register of the mark 16 with the several graduations of the scale 14. In other words, once knowing the balancing effect of the rider when the mark 16 registers with any graduation on the scale 14, that effect is the same whenever the rider is placed upon the balance arm with mark 16 registering with the same graduation.

What I claim is:

1. The combination with a balance beam, of a supporting member, a slidable member supported thereby, and an arm and handle movably engaged with said slidable member and adapted to move said slidable member forward and back on said supporting member and also adapted to be moved forward and back without moving said slidable member to place a rider upon said balance beam or remove it therefrom.

2. The combination with a balance beam, of a supporting member secured adjacent thereto, a member slidable with respect to said supporting member, an arm and handle engaged with said slidable member, said arm being both reciprocable and rotatable with respect to said slidable member and said arm being adapted to engage with said slidable member to move said slidable member either forward or back on said supporting member.

3. The combination with a balance beam of a tube provided with a cut-away portion and a scale adjacent said balance beam, a member slidably retained in said tube and provided with a longitudinal slot with circumferential slots at the ends thereof, an arm secured to a handle adapted to be reciprocated in said longitudinal slot or to be rotated into said circumferential slots.

4. The combination with a balance beam, of a supporting member, a slidable member supported thereby, a rider, and an arm and handle movably engaged with said slidable member and adapted to move said slidable member forward and back upon said supporting member, said arm also being adapted to be moved forward and back without moving said slidable member to place said rider upon said balance beam or remove it therefrom.

5. The combination with a balance beam, of a scale marked member supported adjacent thereto, a member slidably supported adjacent said scale marked member, a rider, and an arm and handle movably engaged with said slidably supported member and adapted to move said slidably supported member forward and back with respect to said scale marked member and also adapted to be moved forward and back without moving said slidably supported member to place the rider upon said balance beam or remove it therefrom.

In witness whereof I hereto affix my signature in presence of two witnesses.

WILFRID HEUSSER.

Witnesses:
ALFRED E. PRITCHARD,
A. HEUSSER.